US012598597B2

(12) United States Patent
Siryy et al.

(10) Patent No.: US 12,598,597 B2
(45) Date of Patent: Apr. 7, 2026

(54) TECHNIQUES FOR RESOURCE ALLOCATION IMPROVEMENT IN A MOBILE NETWORK

(71) Applicant: T-Mobile USA, Inc., Bellevue, WA (US)

(72) Inventors: Maksym Siryy, Overland Park, KS (US); William M. Shvodian, McLean, VA (US); Timur Kochiev, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 342 days.

(21) Appl. No.: 18/338,012

(22) Filed: Jun. 20, 2023

(65) Prior Publication Data

US 2024/0430869 A1 Dec. 26, 2024

(51) Int. Cl.
*H04W 72/0453* (2023.01)
*H04B 17/318* (2015.01)
*H04W 72/51* (2023.01)

(52) U.S. Cl.
CPC ...... *H04W 72/0453* (2013.01); *H04B 17/318* (2015.01); *H04W 72/51* (2023.01)

(58) Field of Classification Search
CPC ....... H04W 76/15; H04W 8/22; H04W 64/00; H04W 72/0453; H04W 72/51; H04W 72/0457; H04B 17/318; H04L 65/1016
See application file for complete search history.

(56) References Cited

U.S. PATENT DOCUMENTS

| 2007/0110017 A1* | 5/2007 | Fulknier ................ H04L 45/00 |
| | | 370/351 |
| 2021/0028847 A1* | 1/2021 | Bedekar .............. H04B 7/0695 |
| 2021/0029691 A1 | 1/2021 | Bassirat et al. |
| 2022/0039101 A1 | 2/2022 | Wang et al. |
| 2022/0303881 A1* | 9/2022 | Menon ............. H04W 28/0858 |

OTHER PUBLICATIONS

Search Report for European Application No. 24179795.0, Dated Oct. 25, 2024, 10 pages.

* cited by examiner

*Primary Examiner* — Iqbal Zaidi
(74) *Attorney, Agent, or Firm* — Lee & Hayes, P.C.

(57) ABSTRACT

Techniques are described herein for allocating bandwidth parts to user devices to enable a range of the user devices to be boosted when they are further away from a base station. In embodiments, such techniques may comprise receiving information about at least one user device operating on a network and determining, based on that information, a signal strength of the at least one user device within a cell. The techniques further comprise determining an allocation of bandwidth parts to be applied to a cell, and determining, based on the signal strength of the user device and the allocation of bandwidth parts, an assigned bandwidth part for the at least one user device. Once such a bandwidth assignment has been determined, the techniques further involve providing the assigned bandwidth part to be used by the at least one user device.

14 Claims, 10 Drawing Sheets

800

900

RECEIVE INFORMATION FOR AT LEAST ONE USER DEVICE
902

DETERMINE A SIGNAL STRENGTH OF THE AT LEAST ONE
USER DEVICE WITHIN A CELL
904

DETERMINE AN ALLOCATION OF BANDWIDTH FOR THE CELL
906

DETERMINE AN ASSIGNED BANDWIDTH PART FOR THE AT
LEAST ONE USER DEVICE
908

PROVIDE THE ASSIGNED BANDWIDTH PART TO THE
AT LEAST ONE USER DEVICE
910

TECHNIQUES FOR RESOURCE ALLOCATION IMPROVEMENT IN A MOBILE NETWORK

BACKGROUND

Cellular networks are frequently used to enable communication between various mobile devices. In a cellular network (such as the Global System for Mobile communication (GSM) and TETRA (TErrestrial Trunked RAdio)), a geographical region is divided into a number of cells, each of which is served by a base station (also referred to as a Base Transceiver Station (BTS)). Such cellular networks are typically made up of a number of base stations that are geographically distributed throughout the geographical region in a way that maximizes wireless transmission coverage for the cellular network.

In cellular networks, individual user devices (e.g., cellular phones) may have a communication range that depends upon a power transmission level for the respective user device. However, user devices that are operating on outer, or edge, frequencies may have insufficient communication range to communicate with a base station.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

This disclosure describes techniques that may be performed to optimally allocate bandwidth parts for use by a number of user devices operating on a network. More particularly, the techniques provide for bandwidth parts to be assigned to user devices (e.g., cellular phones) located within a cell based on their respective signal strengths. In embodiments, user devices having the weakest signal strength are allocated to bandwidth parts positioned closer to the middle of an available bandwidth spectrum. It should be noted that this would typically include those user devices located closer to the edge of the cell (e.g., furthest from a base station in the cell). This enables the user devices having the weakest signal strength to boost their respective transmission power in order to increase their effective transmission range.

Embodiments of the disclosure provide for a number of advantages over conventional systems. For example, the implemented system enables user devices that might typically be out of communication range of a base station to boost their communication abilities (e.g., by increasing transmission power) in order to enable that communication. By allocating the middle of a spectrum to user devices closer to a cell edge, those user devices are provided the ability to boost transmission power in order to achieve greater range.

Figure 1:
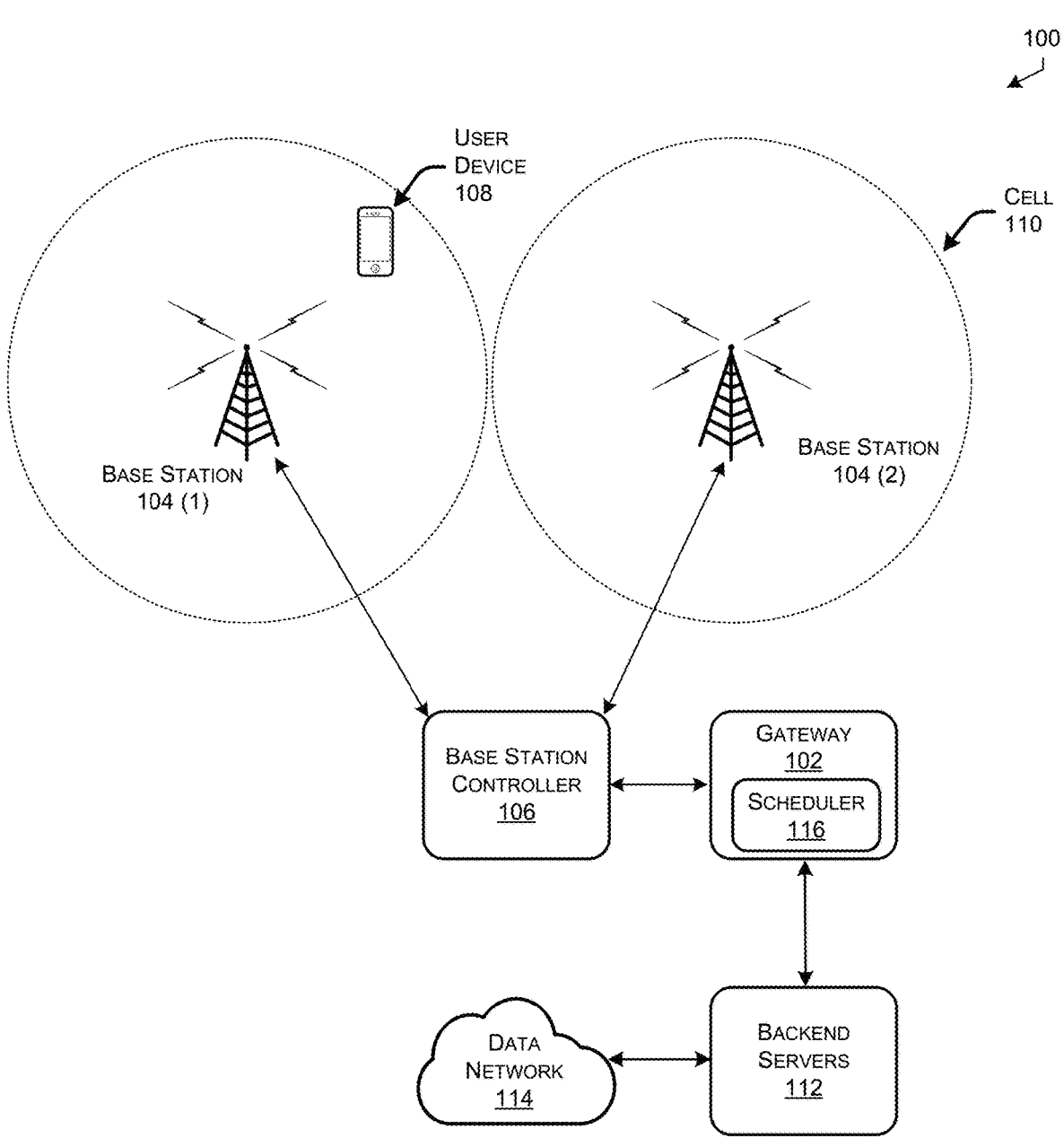
FIG. 1 depicts an example system in which bandwidth can be allocated across a number of user devices in order to optimize network utilization in accordance with some embodiments.

FIG. 1 depicts an example system in which bandwidth can be allocated across a number of user devices in order to optimize network utilization in accordance with some embodiments. In the system 100 depicted in FIG. 1, a gateway device 102 may be in communication with a number of base stations 104 (e.g., base stations 104 (1-2)) via a base station controller (BSC) 106. In some embodiments, the base stations 104 may include one or more radio access units that provide service (e.g., cellular data service) to a user device 108 within a cell 110 that defines a geographic area. The gateway device 102 is in further communication with one or more backend servers 112 capable of communication over a network 114. The network 114 may include one or more electronic devices outside of the system 100.

A gateway device may be any suitable electronic device capable of providing ingress/egress to a network that operates using the base stations 104. A gateway device 102 may be deployed to manage a number of base stations 104 (e.g., base stations) within one of multiple geographic regions. Among other things, the gateway device 102 includes a scheduler component 116 configured to perform traffic allocation and other functionality as described herein. In embodiments, the scheduler is configured to allocate bandwidth assignments to each of a number of user devices 108 that are operating on the network.

A base station 104 may include any suitable type of electronic equipment that includes one or more transmission mechanisms (e.g., a radio transceiver) capable of enabling wireless communication with a number of user devices 108. Such base stations may be distributed over an area in a sufficiently dense manner such that user devices (e.g., mobile communication devices) in communication with the network can communicate with each other or with a terrestrial network. In some embodiments, the base station 104 may include one or more sensors configured to collect information about the base station 104 itself or an environment in which the base station 104 is situated. Additionally, the base station 104 may include one or more mechanical means of adjusting/configuring components of the base station. For example, the base station may include a radio antenna as well as a motorized mechanism for adjusting a position of the radio antenna.

A BSC 106 may include any suitable computing device configured to perform the functions described herein. In embodiments, the BSC 106 manages the radio traffic between neighboring ones of a plurality of base stations 104. Such management of radio traffic may include controlling handoff between sectors and/or base stations as a user device 108 traverses between different cells 110.

A user device 108 may include any suitable electronic device configured to interact with a network. Such a network (e.g., a cellular network) in which the system 100 is implemented may provide network services to one or more user devices 108 via a base station 104. In some non-limiting examples, the user device 108 may be a variety of devices including, for example: a mobile phone, a personal data assistant (PDA), or a mobile computer (e.g., a laptop, notebook, notepad, tablet, etc.) having mobile wireless data communication capability.

The backend servers 112 may include any suitable computing device configured to manage operation of a network (e.g., a cellular network) as implemented herein. In some embodiments, the backend servers 112 may include a Mobile Switching Center (MSC). Among other things, a MSC manages voice calls placed in and out of such a network. For example, the MSC may be configured to route calls to base stations for a particular cell 110 within which a user device 108 is located.

The data network 114 may be the Internet, intranet, extranet, or other suitable local or wide area network capable of communicating information between remote endpoints. For the Internet embodiment, information is transmitted in Internet protocol (IP) packets. It will be understood that information may be transmitted in other suitable packets, including asynchronous transport mode (ATM) and other cells or datagrams.

In operation, the system 100 provides communication services to a number of user devices 108 across a number of cells 110. To do this, a base station 104 located in a respective cell 110 may maintain a communication session with each of the user devices 108 located in that cell 110. For communication purposes, each of those user devices may be assigned a portion of bandwidth (e.g., a bandwidth part (BP)) that represents a range of frequencies that the user device is to transmit within.

The amount of power that a particular user device 108 can use in a transmission (which would impact the range of that transmission) is dependent upon which BP is assigned to that user device 108. In embodiments, a BP is assigned to the user device by a scheduler component 116 based on a number, and relative signal strength, of other user devices in the same cell 110 as the respective user device. In some cases, such a BP assignment can be updated dynamically as the user device moves around in a cell (or switches to a new cell) or as other user devices enter/exit the cell. Accordingly, the user device is further able to adjust its transmission power dynamically as its respective BP is updated. This is described in greater detail below.

The illustrative system 100 may be implemented within a mobile wireless network that incorporates, by way of example, CDMA2000 based mobile wireless network components (e.g., AAA service for performing user authentication and providing user profiles) and includes data services delivered via one or more data access protocols, such as EV-DO, EV-DV or the like. Other embodiments include a wireless access network complying with one or more of LTE, WCDMA, UMTS, GSM, GPRS, EDGE, Wi-Fi (i.e., IEEE 802.11x), Wi-MAX (i.e., IEEE 802.16), or similar telecommunication standards configured to deliver voice and data services to mobile wireless end user devices such as, a user device 108 depicted in FIG. 1 carrying out wireless communications via a base station (also referred to as a base transceiver station or cell site). Such a mobile wireless network system may include hundreds or thousands of such stations.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
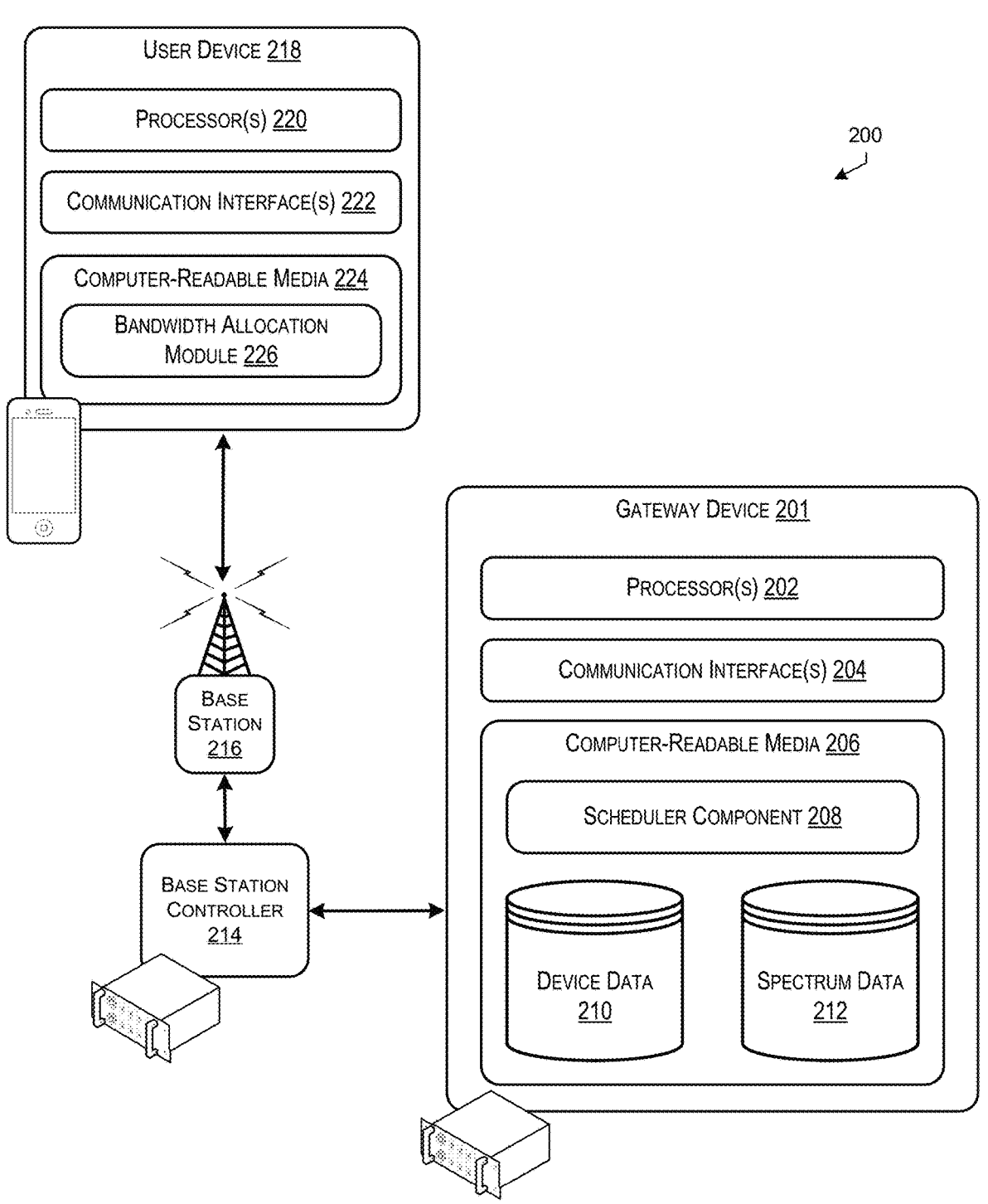
FIG. 2 depicts a component diagram of an example system to be implemented in a network in order to optimize bandwidth allocation across user devices in accordance with at least some embodiments.

FIG. 2 depicts a component diagram of an example system to be implemented in a network (e.g., a mobile network) in order to optimize bandwidth allocation across user devices in accordance with at least some embodiments. As depicted in FIG. 2, a gateway device 201 is in communication with a base station controller (BSC) 214 that manages operations of a number of base stations 216. Each base station 216 may further be in communication with a number of user devices 218 operated by various users. Additionally, as described elsewhere, the gateway device 201 may be further in communication with one or more backend servers and/or an external network.

The exemplary gateway device 201 may be an example of the gateway device 102 as described in relation to FIG. 1 above. It should be noted that such a gateway device (or any other described computing component) may include a single computing device (e.g., a server device) or a combination of computing devices. In some cases, the gateway device may be implemented as a virtual device/system (e.g., via virtual machines implemented within a cloud computing environment).

As illustrated, the gateway device 102 may include one or more hardware processors 202 configured to execute one or more stored instructions. Such processor(s) 202 may comprise one or more processing cores. Further, the gateway device 102 may include one or more communication interfaces 204 configured to provide communications between the gateway device 102 and other devices, such as the base station controller (BSC) 214, network management device 218, or any other suitable electronic device.

The gateway device 102 may also include computer-readable media 206 that stores various executable components (e.g., software-based components, firmware-based components, etc.). The computer-readable media 206 may store components to implement functionality described herein. While not illustrated, the computer-readable media 206 may store one or more operating systems utilized to control the operation of the one or more devices that comprise the gateway device 102. According to one instance, the operating system comprises the LINUX operating system. According to another instance, the operating system(s) comprise the WINDOWS® SERVER operating system from MICROSOFT Corporation of Redmond, Washington. According to further embodiments, the operating system(s) can comprise the UNIX operating system or one of its variants. It should be appreciated that other operating systems can also be utilized.

The computer-readable media 206 may include portions, or components, that configure the gateway device 102 to perform various operations described herein. For example, the computer-readable media 206 may include some combination of components configured to implement the described techniques. Particularly, the gateway device 102 may include a component configured to perform bandwidth allocation for a number of user devices operating on a network (e.g., scheduler component 208). Additionally, the computer-readable media 206 may further maintain one or more databases, such as a database of information maintained in relation to a number of user devices operating on the network (e.g., device data 210) and/or a database of information maintained in relation to allocation of bandwidth (e.g., BPs) within a spectrum (e.g., spectrum data 212).

A scheduler component 208 may be configured to, when executed by the processor(s) 202, determine a range of bandwidth (e.g., a bandwidth portion (BP)) to be assigned to each of a number of user devices. The scheduler component 208 may be configured to allocate BPs to particular user devices based on information about the respective user devices stored in device data 210 as well as based on information about current or future BP assignments stored in spectrum data 212.

The range of bandwidth may be selected from multiple ranges of bandwidth that combine to form a bandwidth spectrum available for operation of user devices on the network. In such a bandwidth spectrum, BPs closest to the center of the spectrum (e.g., the middle 50% of BPs in the spectrum) might be referred to as "inner" BPs, BPs somewhat further from the center of the spectrum might be referred to as "outer" BPs, and BPs at the edge of the spectrum might be referred to as "edge" BPs.

In the case of wireless transmissions, certain regulatory agencies (e.g., the Federal Communications Commission in the United States) regulate spectrum of transmission frequencies that can be used in communications by particular types of devices as well as the transmission strength (as dictated by an amount of power used to transmit) that the device can use. Often times, the strength of a transmission by a device must be lowered or weakened when operating near the edges of the bandwidth spectrum in order to prevent interference with other bandwidth spectrums used by other wireless communication devices. Because of this, user devices that operate in a BP on the edge of the bandwidth spectrum may be prohibited from using as much transmission power as user devices that operate in a BP in the middle of the bandwidth spectrum, resulting in reduced transmission range.

In some embodiments, bandwidth allocation within a particular cell may be allocated based on a number and relative signal strength of user devices within the respective cell. In a simplified example, user devices having a weaker signal strength (which most likely include user devices operating closer to the edge of a cell) may be assigned to inner BPs whereas user devices having a stronger signal strength (which most likely include user devices operating closer to the base station of the cell may be assigned to outer BPs or edge BPs. In such embodiments, the scheduler component 208 may determine a signal strength of one or more user devices with respect to a base station in a cell. In some cases, this may involve calculating a signal strength for each user device based on a strength of a transmission received at the base station from the user device. In other cases, this may involve calculating a distance between locations associated with the respective user device and base station (e.g., using GPS coordinates) and estimating a predicted signal strength based on that distance.

In some embodiments, the scheduler component 208 may be further configured to limit the number of user devices assigned to a particular portion of a bandwidth spectrum. For example, the scheduler component 208 may be configured to ensure that no more than 50 user devices are operating on inner BPs at any given time in order to prevent contention/congestion of those inner BPs. In such cases, the scheduler component 208 may, upon determining that a maximum number of user devices are operating on the inner BPs move one or more user devices to an outer BP or an edge BP.

In embodiments, the scheduler component 208 is configured to allocate BPs for each of a number of user devices within a cell. The scheduler component 208 may be further configured to transmit information to each of those user devices indicating the BP to which the respective user device is assigned. Such information may be used by a module (e.g., bandwidth allocation module 226) on the user device to cause the user device to operate in the respective BP. In some embodiments, the scheduler component 208 is configured to continue to monitor locations and numbers of user devices in one or more cells and to update BP assignments as locations and numbers of user devices change. In these embodiments, the scheduler component 208 is configured to provide the updated BP assignments to user devices in real time (or substantially real time).

The exemplary user device 218 may be an example of the user device 108 as described in relation to FIG. 1 above. As noted elsewhere, a user device 218 may include any suitable electronic device configured to interact with a network (e.g., via communication with the base station 216).

Similar to the gateway device 201, the user device 218 may include one or more hardware processors 220 configured to execute one or more stored instructions. Such processor(s) 220 may comprise one or more processing cores. Further, the user device 218 may include one or more communication interfaces 222 configured to provide communications between the user device 218 and other devices, such as a base station 216 or another suitable electronic device.

Similar to the gateway device 201, the user device 218 may include computer-readable media 224 that stores various executable components (e.g., software-based components, firmware-based components, etc.). The computer-readable media 224 may store components to implement functionality described herein.

The computer-readable media 224 may include portions, or components, that configure the user device 218 to perform various operations described herein. For example, the computer-readable media 224 may include some combination of components configured to implement the described techniques. Particularly, the user device 218 may include a component configured to implement a bandwidth allocation received from a scheduler (e.g., bandwidth allocation component 226).

A bandwidth allocation component 226 may be configured to, when executed by the processor(s) 220, configure a radio transceiver included in the user device 218 to operate using a bandwidth range (e.g., a BP) indicated by the scheduler component 208. In some embodiments, the bandwidth allocation component 226 may be further configured to adjust a level of power used during transmission based on the indicated bandwidth range. For example, the bandwidth range may be associated with a maximum transmission power, such that the bandwidth allocation component 226 is configured to set a current amount of power used in transmissions to be less than or equal to that maximum transmission power. In some embodiments, the bandwidth allocation component 226 may include a timeframe over which the user device is to operate within an indicated bandwidth range. In some embodiments, the bandwidth allocation component 226 causes the user device to operate within an indicated bandwidth range until new instructions are received from the scheduler component 208 to operate in a different bandwidth range. The bandwidth allocation component 226 may alternatively be configured to update a bandwidth range in which the user device is operating even after a current transmission has been completed by the user device or during a current transmission by the user device.

Figure 3:
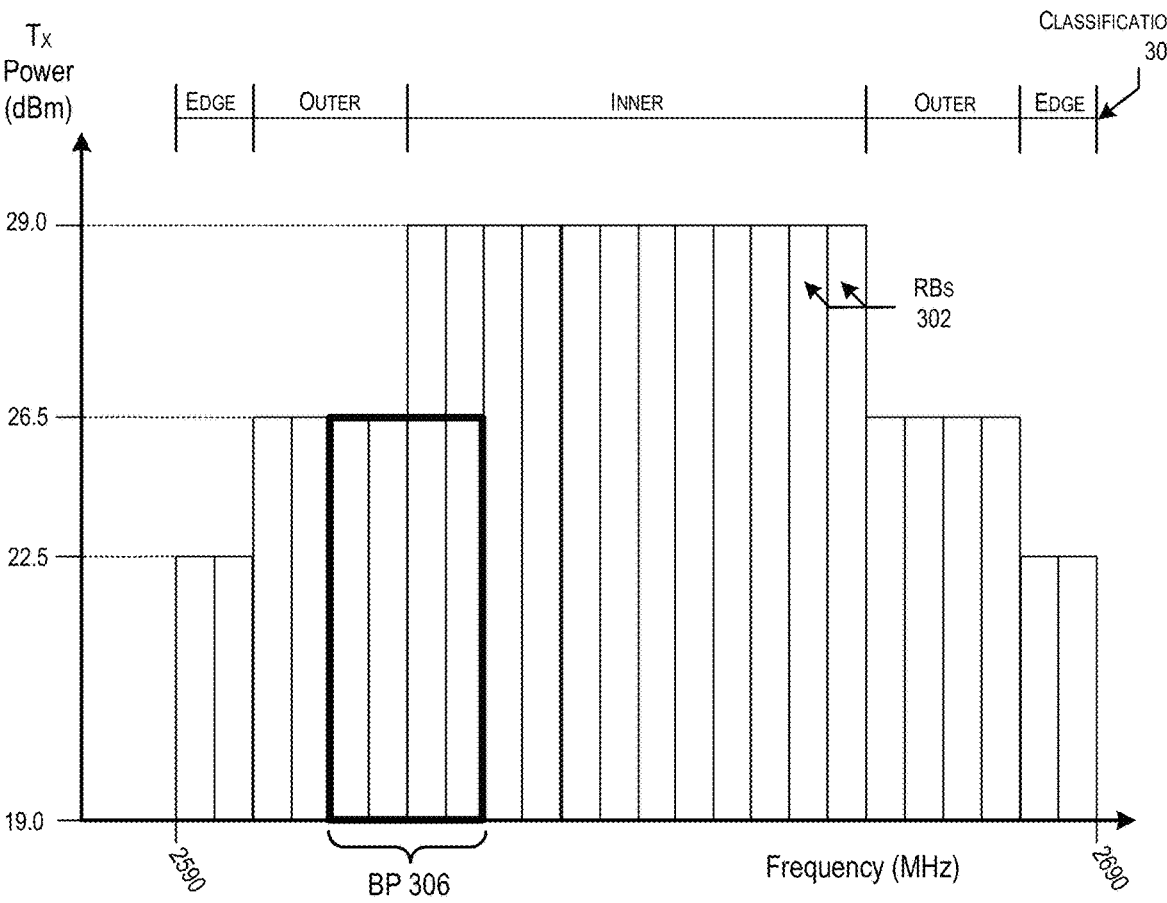
FIG. 3 depicts a bar graph illustrating a relationship between a bandwidth part used by a user device and maximum transmission power for that user device in accordance with some embodiments.

FIG. 3 depicts a bar graph illustrating a relationship between a bandwidth part used by a user device and maximum transmission power for that user device in accordance with some embodiments. More particularly, the bar graph relates to aspects of a bandwidth spectrum that might be assigned to a carrier as well as maximum transmission power that might be assigned to one or more BPs across that spectrum. The X-axis of the bar graph represents a frequency in megahertz. (MHZ) whereas the Y-axis of the bar graph represents a maximum transmission power in decibel-milliwatts (dBm). For illustrative purposes, the frequency is limited to a spectrum having an exemplary range of 2590 MHz to 2690 MHZ, and the transmission power is limited to transmissions having a maximum limit of 29 dBm.

One feature of networks that operate using fifth-generation (5G) technology standard for broadband cellular networks is that a spectrum used by the network can be split up into a number of resource blocks (RBs) 302. A bandwidth part (BP) 306 is a subset of contiguous common physical resource blocks (PRBs). A BP may represent any contiguous portion of the spectrum of any size. While each of the RBs 302 in FIG. 3 are illustrated as being the same size (e.g., a range of 5 MHZ), it should be noted that RBs 302 might be different sizes.

Through the use of such BPs, the spectrum assigned to a network can be subdivided and used for different purposes. Each BP of the spectrum can be associated with its own settings, meaning that each BP can be configured to have its own signal characteristics. Such a feature allows for integrating signals with different requirements. One BP in a spectrum may have reduced energy requirements, while another may support different functions or services, and yet another may provide coexistence with other systems.

As depicted via the bar graph, various RBs 302 may be assigned different maximum power transmission thresholds. As also depicted, such assignments may be made roughly along a bell-shaped curve. The reason for assigning maximum power transmission thresholds in this way is to reduce the power transmission around the edges of the spectrum in order to prevent interference with devices that operate on frequencies outside of the spectrum. Accordingly, each of a number of RBs 302 may be given a classification 304 (e.g., "inner," "outer," "edge") based on its relative location within the spectrum. Each RB 302 may then be assigned a respective maximum power transmission threshold based on its classification. Classifications may be spectrum dependent and may be made based on a relative position of the RB from the center of the spectrum. For example, each of the RBs in the middle 50% of the spectrum may be given a classification of "inner."

It should be noted that a user device may be configured to receive and transmit communications within different BPs. For example, the user device may be configured to receive communications from a base station (e.g., a downlink) via a first BP and transmit communications to a base station (e.g., an uplink) via a second BP. In embodiments, a user device may include a set of multiple BPs to be used. For example, a user device can be configured with up to four BPs to be used in uplink and/or four BPs to be used in downlink. However, only one BP in the uplink and one BP in the downlink may be active at a given time.

In some embodiments, a maximum power transmission for a user device may be based on the BP 306 assigned to the user device. For example, a user device may be assigned to use BP 306 that includes a range of RBs 302 that fall within both outer and inner classifications. In this example, the transmission power for such a user device may be capped based on the most restrictive RB 302 within the BP 306. In the depicted example, the user device may be restricted to using a transmission power that corresponds to outer RBs, even if the UE is currently operating using a RB 302 that is classified as an inner BP because the BP 306 includes both inner and outer RBs.

Figure 4:
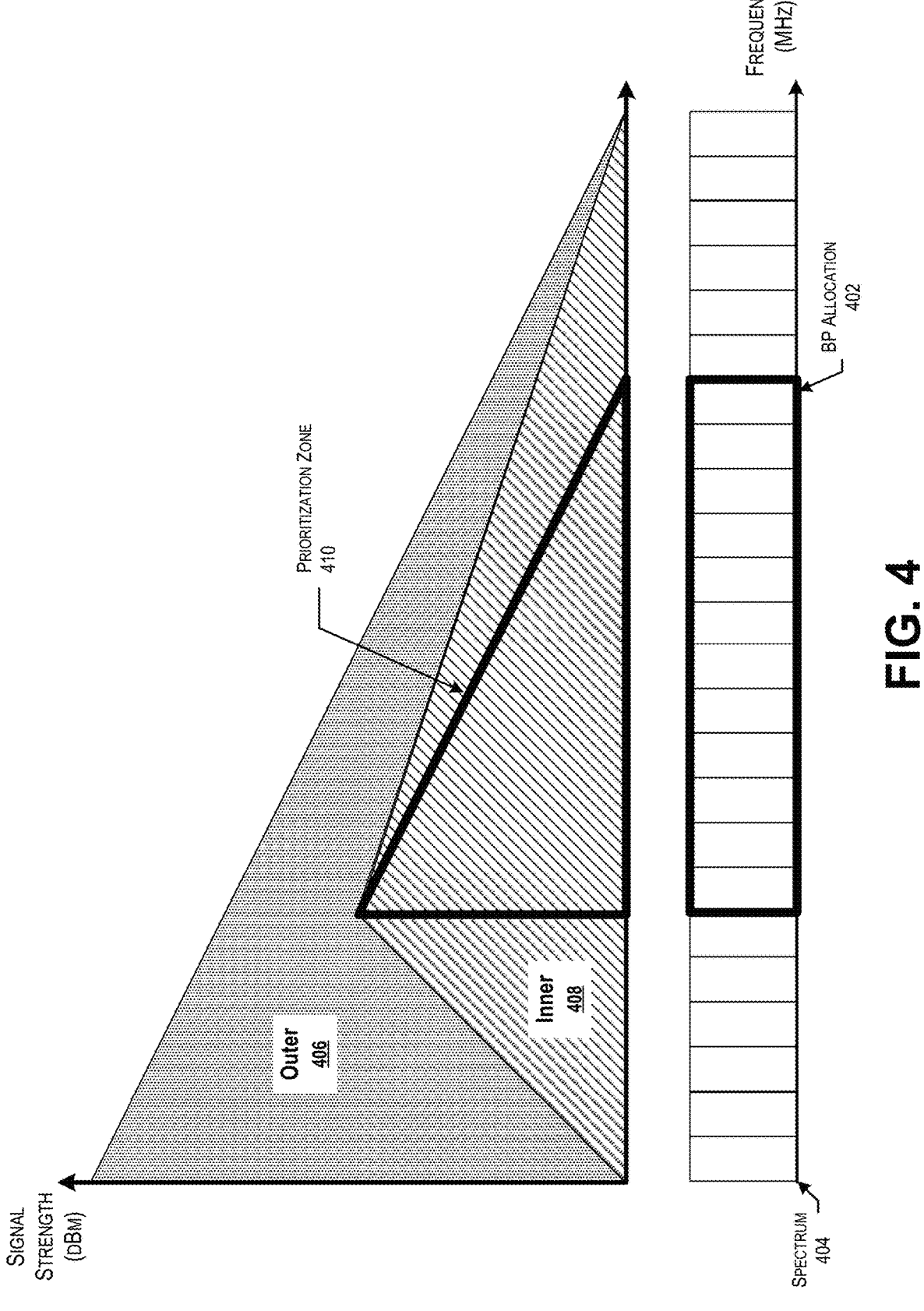
FIG. 4 depicts a graphical illustration of an exemplary relationship between signal strength and transmission frequency that may be used by a scheduler to allocate bandwidth parts to one or more user devices.

FIG. 4 depicts a graphical illustration of an exemplary relationship between signal strength and transmission frequency that may be used by a scheduler to allocate bandwidth parts to one or more user devices. More particularly. FIG. 4 depicts an exemplary bandwidth part that may be allocated to a user device based on information determined for a transmission received from that user device. In the depicted graphical illustration, a position and size of the bandwidth part 402 allocated to a user device may each be determined within a spectrum 404 based on information related to the received transmission.

In some embodiments, the information related to a user device transmission that is used to allocate a bandwidth part to that user device may include at least a frequency (or resource block) on which the user device is currently operating (as depicted in FIG. 4 along the X axis) as well as a signal strength determined for the received transmission (as depicted in FIG. 4 along the Y axis). In some cases, as illustrated in the examples described in FIG. 5 and FIG. 6 below, a starting position of the BP allocation 402 may be determined based on a frequency (or RB) associated with the transmission whereas a number of RBs included in the BP allocation (e.g., a length of the BP) may be determined based on a signal strength of the received transmission.

As illustrated, the graphical illustration denotes a first area 406 associated with an outer bandwidth allocation as well as a second area 408 within which a BP allocation may include at least some inner RBs in a resulting BP allocation. In some cases, there may exist a prioritization zone 410 within which any received transmission would be guaranteed to result in an allocation to an inner BP 402 by virtue of the allocation of that BP being made using the illustrated relationship. Essentially, any transmission having a combination of signal strength and frequency that falls within the prioritization zone 410 would be guaranteed to be result in a BP allocation that is entirely classified as inner.

Note that even if a received transmission falls within the second area 408 (associated with inner BPs), such a transmission would not necessarily be allocated a BP 402 that falls entirely within the inner classification, which might result in a reduced transmission power for the user device. Recall that, as described in relation to FIG. 3 above, if any of the RBs in an allocated BP (e.g., BP 306) fall into a different category (e.g., outer) then transmission power for that user device would be capped at the lowest maximum power transmission for each of the RBs in the BP. Hence, any received transmissions located outside of the prioritization zone 410 may not be guaranteed to result in allocation of an inner BP for the user device from which the transmission is received.

Figure 5:
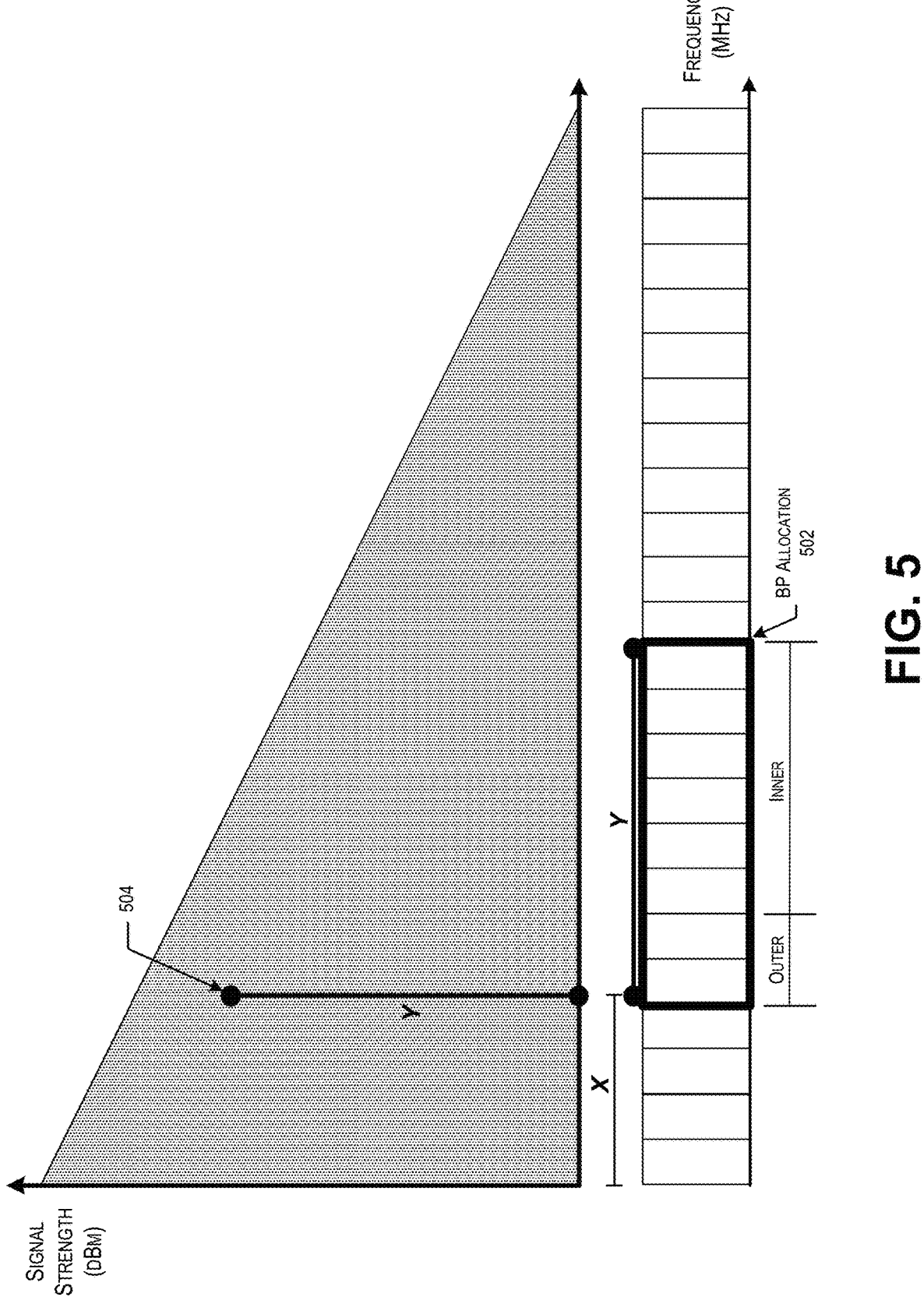
FIG. 5 depicts a first example of a bandwidth part allocation to be made to a user device based on a transmission received at a base station from that user device in accordance with embodiments.

FIG. 5 depicts a first example of a bandwidth part allocation to be made to a user device based on a transmission received at a base station from that user device in accordance with embodiments. Particularly, the illustrated first example relates to allocation of a BP 502 to a user device based on information in a received transmission from that user device. In the illustrated example, the information related to the transmission received from the user device is plotted at point 504 with an X component (e.g., along a horizontal axis) and a Y component (e.g., along a vertical axis).

As noted elsewhere, a BP may be any contiguous series of RBs. The BP may include any number of RBs. In the illustrated example of FIG. 5, a BP 502 may be allocated to a user device based on one or more values associated with a transmission received from that user device. More particularly, the BP 502 may be allocated such that the RBs included in the BP are determined based on those values. For example, a starting RB to be allocated within the BP 502 may be determined based on the X component for the plotted point 504. In other words, the starting RB used to generate the BP 502 might be the RB that the user device is currently operating on. In another example, the number of RBs allocated to the BP 502 (e.g., the length of the BP) may be determined based on a Y component for the plotted point 504. In other words, the number of RBs included in an allocated BP may depend on the determined signal strength associated with the received transmission, with a higher signal strength resulting in more RBs allocated to the BP 502.

As illustrated in FIG. 5, while a number of RBs assigned to the BP 502 are inner BPs, some portion of those RBs are outer BPs. Accordingly, the user device, when operating using the allocated BP 502, would be required to limit its transmission power based on the maximum transmission power associated with the outer RBs (as described in relation to FIG. 3 above).

Figure 6:
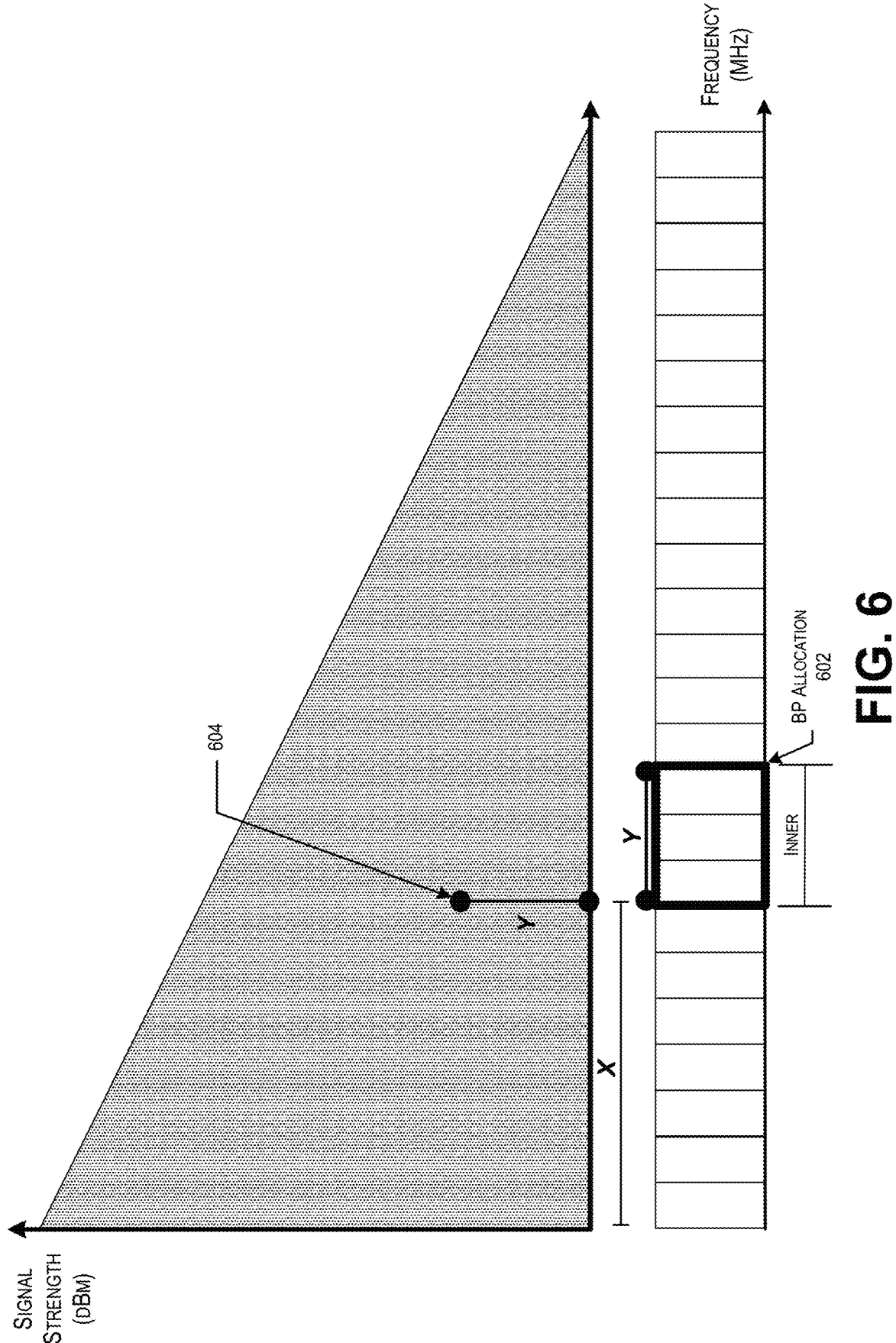
FIG. 6 depicts a second example of a bandwidth part allocation to be made to a user device based on a transmission received at a base station from that user device in accordance with embodiments.

FIG. 6 depicts a second example of a bandwidth part allocation to be made to a user device based on a transmission received at a base station from that user device in accordance with embodiments. As with the previous example, the information related to the transmission received from the user device is plotted at point 604 with an X component (e.g., along a horizontal axis) and a Y component (e.g., along a vertical axis).

As in the previous example, a starting RB to be allocated within the BP 602 may be determined based on the X component for the plotted point 604. In other words, the starting RB used to generate the BP 602 might be the RB that the user device is currently operating on. In another example, the number of RBs allocated to the BP 602 (e.g., the length of the BP) may be determined based on a Y component for the plotted point 604. In other words, the number of RBs included in an allocated BP may depend on the determined signal strength associated with the received transmission, with a higher signal strength resulting in more RBs allocated to the BP 602.

As illustrated in FIG. 6, each of the RBs assigned to the BP 602 are inner BPs. Accordingly, the user device, when operating using the allocated BP 602, would be able to boost its transmission power to the maximum transmission power associated with the inner RBs (as described in relation to FIG. 3 above).

Figure 7:
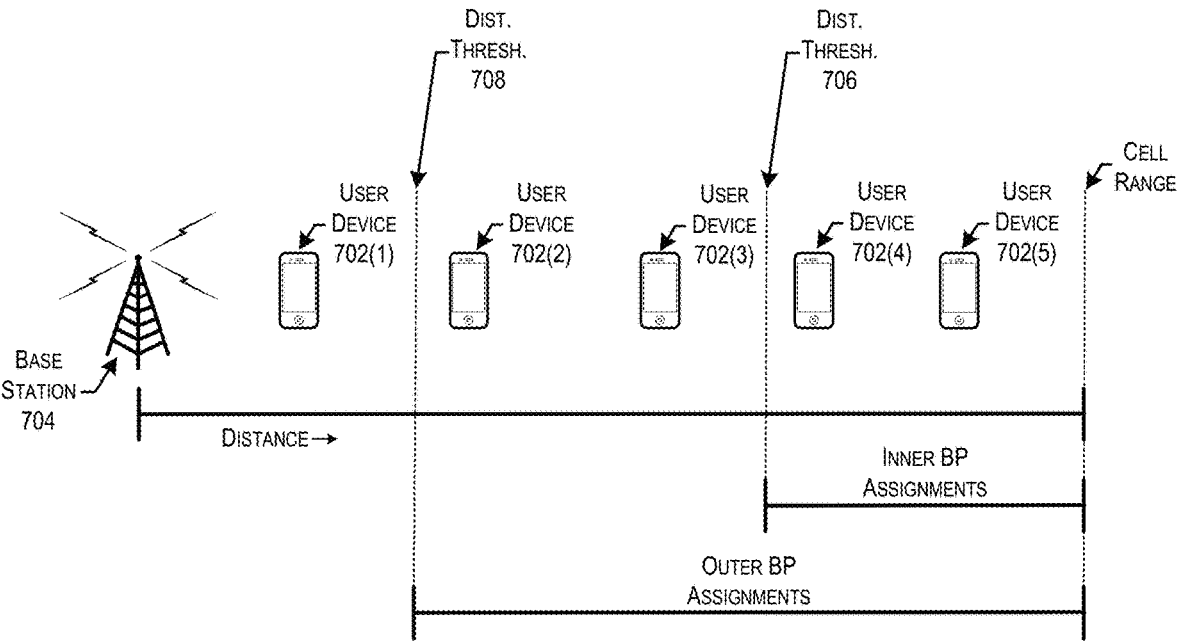
FIG. 7 depicts a diagram illustrating a relationship between user device distance and density and bandwidth allocation in accordance with some embodiments.

FIG. 7 depicts a diagram illustrating a relationship between user device distance and density and bandwidth allocation in accordance with some embodiments. It should be noted that while FIG. 7 is described in relation to distance, distance might actually be representative of a signal strength of the user devices. Note that as a distance between a user device and a base station is increased, a signal strength for that user device may decline. However, it should further be noted that a number of reasons other than distance alone may cause a signal strength to decline, such as the user device being located indoors and/or various obstacles. Accordingly, while the FIG. 7 described embodiments in which a scheduler assigns BPs based on a relative distance for the user devices, the scheduler may be configured to assign BPs to the user devices in a cell based on a relative signal strength of the user devices in some embodiments.

As noted elsewhere, a number of user devices 702 (1-5) may operate on a network. In this example, the user devices 702 may be physically located within a cell that is serviced by a base station 704. Such a cell may have a cell range that corresponds to a transmission range of the base station 704. It should be recognized that a shape and/or size of the cell may vary depending upon transmission power for the base station 704 as well as geographical features in range of the cell.

In embodiments, the base station 704 may receive information (e.g., status updates and/or "heartbeat" communications) from the user devices with which it is in communication. In these embodiments, the base station may identify a number and/or density of the user devices in its cell as well as a relative location of (or at least a distance of) the user devices. For example, a base station 704 may receive global positioning system (GPS) data from a user device that indicates a current location of that user device. In another example, the base station 704 may determine a distance of a user device 702 from the base station 704 based on a strength of a signal (e.g., a "heartbeat" communication) received from the respective user device 702.

In embodiments, a determination may be made as to a distribution of BP allocations to be made to user devices within the cell. In some cases, this may involve determining a maximum number of user devices to be allocated to each of a number of BP categories. Such a maximum number may be determined based on a maximum number of user devices that can be serviced at any given time on each BP.

Once an appropriate distribution of BP allocations has been determined for the number of user devices, specific assignments may be made. To do this, a determination may first be made as to whether the total number of user devices 702 serviced by the base station is greater than a threshold number that represents a total number of user devices that can be operated on inner BPs. Provided that the number of user devices 702 serviced by the base station is greater than that threshold number, a set of user devices may be identified that includes less than or equal to that threshold number. Such a set of user devices are selected from the user devices within a cell located closest to the edge of that cell (e.g., furthest from the base station 704).

In some cases, a first distance threshold 706 may be determined as a distance from the base station based on a density/distribution of the user devices within a cell. For example, the first distance threshold 706 may be determined such that a number of user devices (e.g., user devices 702

(4-5)) located between the first distance threshold 706 and the edge of the cell range is less than or equal to a number of user devices to be assigned to inner BPs. In these cases, each of the user devices 702 located within a cell that are further away from the base station 704 then the first distance threshold 706 would be assigned to inner BPs by a scheduler component (e.g., scheduler 116 of FIG. 1).

Additionally, a determination may be made as to whether the number of user devices 702 serviced by the base station that are not assigned to the inner BPs is greater than a second threshold number that represents a total number of user devices that can be operated on outer BPs. Provided that the number of user devices 702 serviced by the base station that are not assigned to inner BPs is greater than that second threshold number, a second set of user devices may be identified that includes less than or equal to that second threshold number. Such a set of user devices are selected from the user devices not assigned to the inner BPs and within the cell located furthest away from the base station 704.

In some cases, a second distance threshold 708 may be determined (similarly to the first distance threshold) as a distance from the base station based on a density/distribution of the user devices within a cell. For example, the second distance threshold 708 may be determined such that a number of user devices (e.g., user devices 702 (2-3)) located between the second distance threshold 708 and the first distance threshold 706 is less than or equal to a number of user devices to be assigned to outer BPs. In these cases, each of the user devices 702 located within a cell that are between the second distance threshold 708 and the first distance threshold 706 would be assigned to outer BPs by the scheduler component.

In some cases, at least some user devices 702 that are not assigned to either the outer BPs or inner BPs (e.g., user device 702 (1)) may be assigned to edge BPs. It would be recognized by one skilled in the art that such user devices would include those closest to the base station 704.

Figure 8:
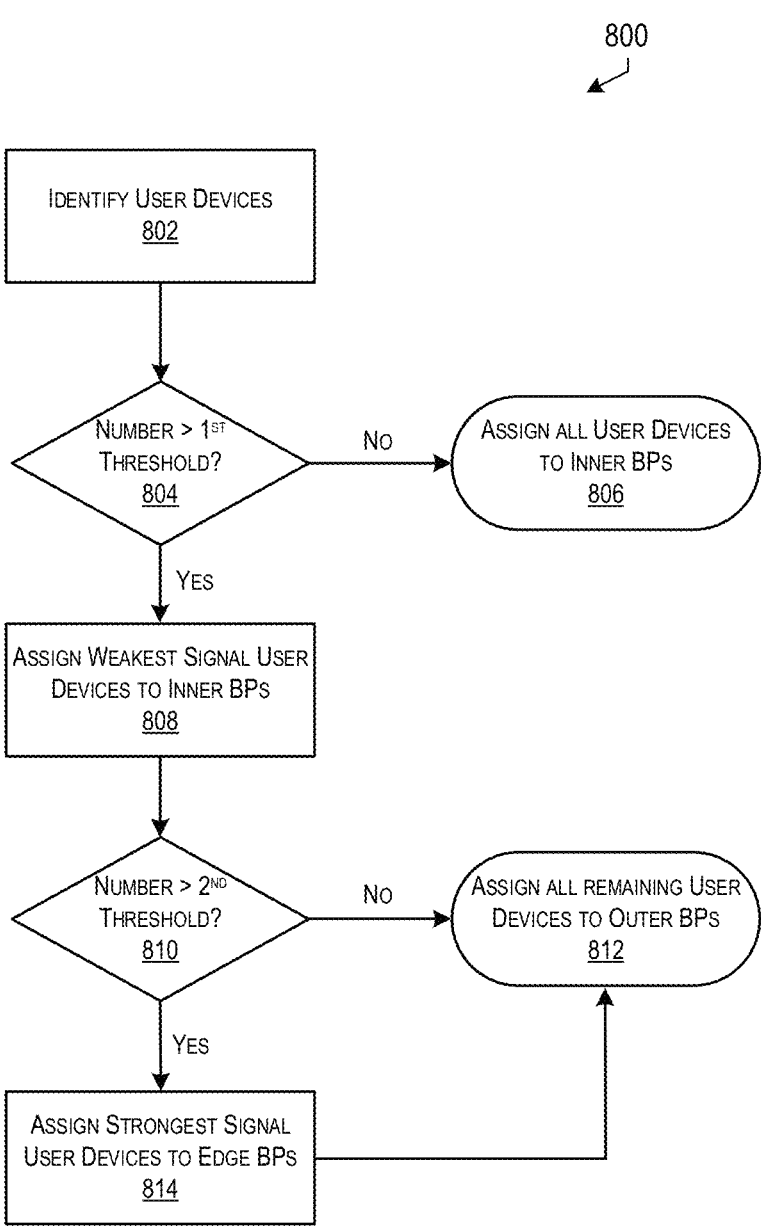
FIG. 8 depicts a flow chart illustrating an exemplary process for allocating bandwidth to one or more user devices operating on a network in accordance with at least some embodiments.

FIG. 8 depicts a flow chart illustrating an exemplary process for allocating bandwidth to one or more user devices operating on a network in accordance with at least some embodiments. In some embodiments, the process 800 is performed on a repeating basis. For example, a scheduler component may continue to monitor information about user devices located within the cell in order to update an allocation of BPs as that information is updated.

At 802, the process 800 may involve identifying the user devices serviced by a base station (e.g., located within a cell associated with the base station). In embodiments, the base station maintains information about all user devices that are currently in communication range of that base station. As noted elsewhere, this information may include information about a location, or relative location, of the respective user devices within the cell.

At 804, the process 800 may involve making a determination as to whether a total number of user devices identified within a cell is greater than or less than a first threshold number. In these embodiments, the first threshold number may represent a maximum number of user devices that can be assigned to inner BPs. Such a maximum number may be determined based on a congestion of traffic over the network. In some cases, the first threshold number may be determined as a portion of the total number of user devices located within the cell. For example, the first threshold may be set as a number that is 40% of the total number of user devices within the cell.

Upon making a determination that the total number of user devices within the cell is not greater than the first threshold (e.g., "No" at 804) the process 800 may involve assigning all of those user devices in the cell to inner BPs at 806. In this way, it may be optimal for all of the user devices in the cell to be assigned to inner BPs where possible.

Upon making a determination that the total number of user devices within the cell is greater than the first threshold (e.g., "Yes" at 804) the process 800 may involve assigning a number of those user devices in the cell that is less than or equal to the first threshold number to inner BPs at 808. At this step, the user devices that are assigned to the inner BPs are selected by virtue of having the weakest signal strength of the user devices in relation to the base station. As noted elsewhere, a current signal strength for a particular user device may be determined based on a strength of a received transmission from that user device or based on a relative distance of the user device from the base station (e.g., user devices that are determined to be further away from the base station may be predicted to have a weaker signal strength).

At 810, the process 800 may involve making a second determination as to whether a number of user devices within a cell that are not to be assigned to inner BPs is greater than or less than a second threshold number. In these embodiments, the second threshold number may represent a maximum number of user devices that can be assigned to outer BPs. As with the assignment of inner BPs, such a maximum number may be determined based on a congestion of traffic over the network.

Upon making a determination that the number of user devices within the cell that are not assigned to inner BPs is not greater than the second threshold (e.g., "No" at 810) the process 800 may involve assigning all of those user devices (e.g., all user devices not already assigned to inner BPs) in the cell to outer BPs at 812.

Upon making a determination that the number of user devices within the cell that are not assigned to inner BPs is greater than the second threshold (e.g., "Yes" at 810) the process 800 may involve assigning some portion of the unassigned user devices to edge BPs at 814 and assigning another portion of those user devices that is less than or equal to the second threshold number to outer BPs at 812. In these cases, the number of user devices assigned to the outer BPs at 812 may be less than or equal to the second threshold number. The user devices assigned to the edge BP would be those user devices over the second threshold number that are are determined to have the strongest signal strength.

Figure 9:
FIG. 9 depicts a flow diagram illustrating an exemplary process allocating bandwidth parts to user devices based on respective signal strengths of those user devices in accordance with at least some embodiments.
Figure 9:
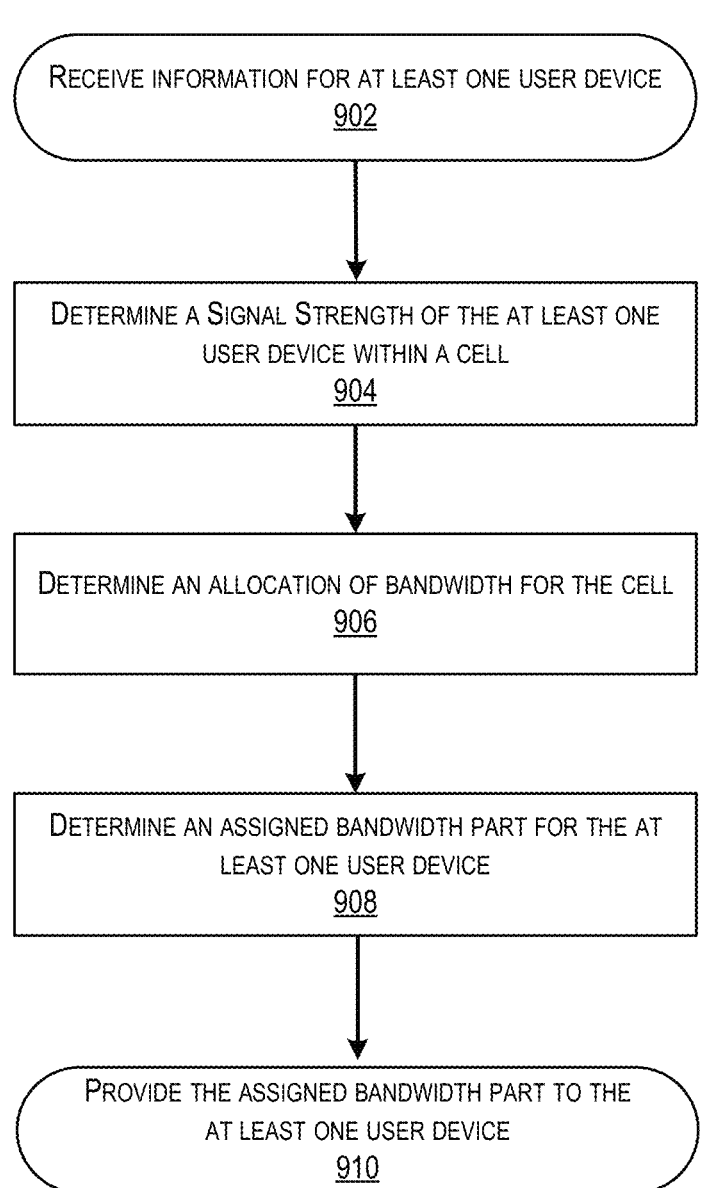

FIG. 9 depicts a flow diagram illustrating an exemplary process allocating bandwidth parts to user devices based on respective signal strengths of those user devices in accordance with at least some embodiments. The process 900 may be performed by a scheduler component implemented within a gateway device, such as the gateway device 102 as described in relation to FIG. 1 above.

At 902, the process 900 may involve receiving information about a number of user devices operating on a network. In embodiments, the information may relate to user devices located within a particular cell. In some embodiments, the information about the number of user devices operating in the cell is received from a base station associated with the cell.

At 904, the process 900 may involve determining a respective signal strengths of the number of user devices operating on the network. In some embodiments, determining the signal strengths of the user devices within a cell are based on determining a respective strength of a most recent transmission received from the respective user devices. In some cases, a signal strength is estimated based on a location of a user device in relation to the base station. In such cases, determining a location of the at least one user device may be performed based on global positioning system data for the respective user device. In some embodiments, the location of the at least one user device within a cell is a distance of the one user device from a base station in the cell. In at least some of these embodiments, the distance of the one user device from the base station within the cell is determined based on a strength of a signal received from the user device by the base station.

In some cases, a signal strength is determined as an exact signal strength value. In other cases, the signal strength may be a relative value. For example, rather than determine an exact signal strength value for each of the user devices in a cell, the scheduler may determine a ranking or priority of the signal strengths of the respective user devices. In this example, the scheduler may rank each of the user devices located in the cell according to relative signal strengths of those user devices.

At 906, the process 900 may involve determining an allocation of bandwidth parts to be associated with the cell. In embodiments, the allocation of bandwidth parts within the cell is determined based on a total number of user devices and a distribution of the user devices within the cell. In some embodiments, a bandwidth part within the allocation of bandwidth parts is given a classification based on a relative position of the bandwidth part within a bandwidth spectrum. In embodiments, the allocation of bandwidth parts comprises an assignment of user devices having the weakest signal strength to bandwidth parts positioned in the middle of a bandwidth spectrum.

At 908, the process 900 may involve determining, based on the allocation of bandwidth parts associated with the cell and the respective signal strength of the user devices within the cell, an assigned bandwidth part for at least one user device. In some embodiments, the assigned bandwidth part to be used by the at least one user device is determined based on a distance of the at least one user device from a base station within the cell. The assigned bandwidth part may also be associated with a level of transmission power to be used by the at least one user device.

At 910, the process 900 may involve providing the assigned bandwidth assignment to the user device. In some cases, this may involve providing the bandwidth assignment to the base station to be relayed to the user device. Upon receiving that bandwidth assignment from the base station, the user device may implement that bandwidth part assignment by causing a communication module within the user device to operate using the bandwidth part indicated in the bandwidth part assignment. In some cases, the user device may be further caused to adjust a level of transmission power that it uses in transmissions to a base station based on the bandwidth part. More particularly, the user device may adjust the power level to a maximum level of power associated with the bandwidth part. Such a maximum level of power may correspond to a position of the assigned bandwidth part within a bandwidth spectrum.

Figure 10:
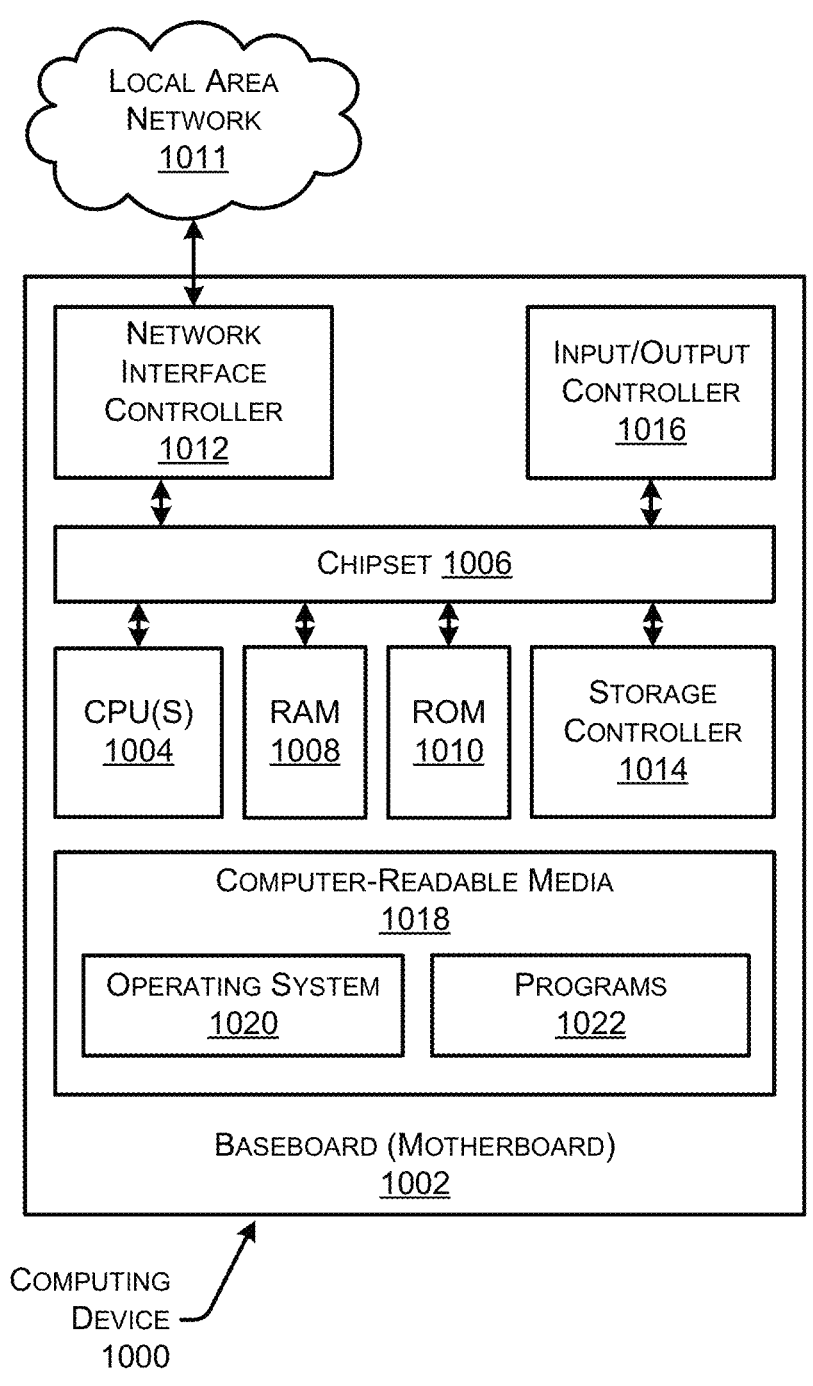
FIG. 10 shows an example computer architecture for a computing device capable of executing program components for implementing the functionality described above.

FIG. 10 shows an example computer architecture for a computing device 1000 capable of executing program components for implementing the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein. The computing device 1000 may, in some examples, correspond to a physical server as described herein, and may comprise networked devices such as servers, switches, routers, hubs, bridges, gateways, modems, repeaters, access points, etc.

The computing device 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computing device 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computing device 1000 and to transfer information between the various components and devices. The ROM 1010 or NVRAM can also store other software components necessary for the operation of the computing device 1000 in accordance with the configurations described herein.

The computing device 1000 can operate in a networked environment using logical connections to remote computing devices and computer systems through a network, such as the network 711. The chipset 1006 can include functionality for providing network connectivity through a NIC 1012, such as a gigabit Ethernet adapter. The NIC 1012 is capable of connecting the computing device 1000 to other computing devices over the network 711. It should be appreciated that multiple NICs 1012 can be present in the computing device 1000, connecting the computer to other types of networks and remote computer systems.

The computing device 1000 can be connected to a storage device 1018 that provides non-volatile storage for the computer. The storage device 1018 can store an operating system 1020, programs 1022, and data, which have been described in greater detail herein. The storage device 1018 can be connected to the computing device 1000 through a storage controller 1014 connected to the chipset 1006. The storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 1000 can store data on the storage device 1018 by transforming the physical state of the physical storage units to reflect the information being stored.

The specific transformation of physical state can depend on various factors, in different embodiments of this description. Examples of such factors can include, but are not limited to, the technology used to implement the physical storage units, whether the storage device 1018 is characterized as primary or secondary storage, and the like.

For example, the computing device 1000 can store information to the storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1000 can further read information from the storage device 1018 by detecting the physical states or characteristics of one or more particular locations within the physical storage units.

In addition to the mass storage device 1018 described above, the computing device 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 1000. In some examples, the operations performed by devices as described herein may be supported by one or more devices similar to computing device 1000. Stated otherwise, some or all of the operations performed by an edge device, and/or any components included therein, may be performed by one or more computer device 1000 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1018 can store an operating system 1020 utilized to control the operation of the computing device 1000. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1018 can store other system or application programs and data utilized by the computing device 1000.

In one embodiment, the storage device 1018 or other computer-readable storage media is encoded with computer-executable instructions which, when loaded into the computing device 1000, transform the computer from a generalpurpose computing system into a special-purpose computer capable of implementing the embodiments described herein. These computer-executable instructions transform the computing device 1000 by specifying how the CPUs 1004 transition between states, as described above. According to one embodiment, the computing device 1000 has access to computer-readable storage media storing computer-executable instructions which, when executed by the computing device 1000, perform the various processes described above with regard to the other figures. The computing device 1000 can also include computer-readable storage media having instructions stored thereupon for performing any of the other computer-implemented operations described herein.

The computing device 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computing device 1000 might not include all of the components shown in FIG. 10, can include other components that are not explicitly shown in FIG. 10, or might utilize an architecture completely different than that shown in FIG. 10.

As described herein, the computing device 1000 may include one or more hardware processors 1004 (processors) configured to execute one or more stored instructions. The processor(s) 1004 may comprise one or more cores. Further, the computing device 1000 may include one or more network interfaces configured to provide communications between the computing device 1000 and other devices, such as the communications described herein as being performed by an edge device. The network interfaces may include devices configured to couple to personal area networks (PANs), wired and wireless local area networks (LANs), wired and wireless wide area networks (WANs), and so forth. More specifically, the network interfaces include the mechanical, electrical, and signaling circuitry for communicating data over physical links coupled to the network 711. The network interfaces may be configured to transmit and/or receive data using a variety of different communication protocols. Notably, a physical network interface may also be used to implement one or more virtual network interfaces, such as for virtual private network (VPN) access, known to those skilled in the art. In one example, the network interfaces may include devices compatible with Ethernet, Wi-Fi™, and so forth.

The programs 1022 may comprise any type of programs or processes to perform the techniques described in this disclosure. The programs 1022 may comprise any type of program that cause the computing device 1000 to perform techniques for communicating with other devices using any type of protocol or standard usable for determining connectivity. These software processors and/or services may comprise a scheduler component, as described herein, any of which may alternatively be located within individual base stations.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing module contains computer executable instructions executed by the processor to perform functions provided by one or more routing protocols. These functions may, on capable devices, be configured to manage a routing/forwarding table (a data structure) containing, e.g., data used to make routing forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (i.e., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing module may implement a process that consists solely of providing mechanisms necessary for source routing techniques. That is, for source routing, other devices in the network can tell the less capable devices exactly where to send the packets, and the less capable devices simply forward the packets as directed.

In various embodiments, as detailed further below; PE Module may also include computer executable instructions that, when executed by processor(s), cause computing device 1002 to perform the techniques described herein. To do so, in some embodiments, PE Module may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, PE Module may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as normal or anomalous. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that path evaluation process can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted an undesirable behavior of a path, such as its delay, packet loss, and/or jitter exceeding one or more thresholds. Conversely, the false negatives of the model may refer to the number of times the model incorrectly predicted acceptable path behavior. True negatives and positives may refer to the number of times the model correctly predicted whether the behavior of the path will be acceptable or unacceptable, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

receiving, at a computing device, information about at least one user device operating on a network;

determining, by the computing device based on the information, a signal strength associated with the at least one user device within a cell;

determining, by the computing device, an allocation of bandwidth parts to be associated with a cell;

determining, by the computing device based on the signal strength associated with the at least one user device and the allocation of bandwidth parts, an assigned bandwidth part for the at least one user device, wherein the assigned bandwidth part is associated with a level of transmission power to be used by the at least one user device and the level of transmission power corresponds to a position of the assigned bandwidth part within a bandwidth spectrum; and providing, by the computing device, the assigned bandwidth part to be used by the at least one user device.

2. The method of claim 1, wherein the assigned bandwidth part to be used by the at least one user device is an inner bandwidth part and wherein the signal strength is below a threshold signal strength value.

3. The method of claim 2, wherein the signal strength of the at least one user device is determined based on a transmission strength of a signal received from the at least one user device by a base station within the cell.

4. The method of claim 1, wherein the assigned bandwidth part to be used by the at least one user device is further determined based on a total number of user devices operating within the cell.

5. The method of claim 1, wherein the signal strength of the at least one user device within a cell is determined based at least in part on a distance of the at least one user device from a base station in the cell.

6. The method of claim 5, wherein determining the distance of the at least one user device from the base station is based at least in part on global positioning system data for the at least one user device.

7. The method of claim 1, wherein the information about the at least one user device operating on the network is received from a base station associated with the cell.

8. A computing device comprising:
one or more processors; and
one or more non-transitory computer-readable media storing computer-executable instructions that are executable by the one or more processors to perform operations comprising:
   receiving information about at least one user device operating within a cell of a network;
   determining, based on the information, a signal strength of the at least one user device within the cell;
   determining an allocation of bandwidth parts to be associated with the cell, wherein the allocation of bandwidth parts within the cell is determined based on a total number of user devices and a distribution of the user devices within the cell, and wherein a bandwidth part within the allocation of bandwidth parts is given a classification based on a relative position of the bandwidth part within a bandwidth spectrum;

determining, based at least in part on the signal strength and the allocation of bandwidth parts, an assigned bandwidth part for the at least one user device; and
providing the assigned bandwidth part to be used by the at least one user device within the cell.

9. The computing device of claim 8, wherein the computing device comprises a gateway device and the computer-executable instructions comprise a scheduler component.

10. The computing device of claim 8, wherein the allocation of bandwidth parts comprises an assignment of user devices associated with a weakest signal strength to bandwidth parts positioned in the middle of a bandwidth spectrum.

11. The computing device of claim 8, wherein the assigned bandwidth part is associated with a level of transmission power to be used by the at least one user device.

12. The computing device of claim 8, wherein the signal strength of the at least one user device is determined based on at least one of global positioning system data for the at least one user device or a strength of a signal received from the at least one user device by a base station within the cell.

13. One or more non-transitory computer-readable media storing computer-executable instructions that the are executable by one or more processors to perform operations comprising:
   receiving information about at least one user device operating within a cell of a network;
   determining, based on the information, a signal strength of the at least one user device within the cell, wherein the signal strength of the at least one user device is determined based on a transmission received from the at least one user device by a base station within the cell;
   determining an allocation of bandwidth parts to be associated with the cell;
   determining, based on the signal strength and the allocation of bandwidth parts, an assigned bandwidth part for the at least one user device, wherein the assigned bandwidth part for the at least one user device is further determined based on a frequency associated with the transmission; and
providing the assigned bandwidth part to be used by the at least one user device within the cell.

14. The one or more non-transitory computer-readable media of claim 13, wherein the assigned bandwidth part is associated with a level of transmission power to be used by the at least one user device.

* * * * *